United States Patent Office 3,058,996
Patented Oct. 16, 1962

3,058,996
CYCLODEHYDRATION OF ADDUCTS OF PER-HALOGENATED CYCLOPENTADIENE AND DIOLS
Erhard J. Prill, Dayton, Ohio, assignor to Monsanto Chemical Company, St. Louis, Mo., a corporation of Delaware
No Drawing. Filed Oct. 28, 1957, Ser. No. 692,536
8 Claims. (Cl. 260—346.2)

This invention relates to a method for preparing 1,7,8,9,10,10-hexahalo-4-oxatricyclo(5.2.1.0$^{2,6}$)-8 decenes.

In my copending application Serial No. 537,299, filed September 28, 1955, and now abandoned, I have described and claimed a method by which the first-formed Diels-Alder addition product of hexachlorocyclopentadiene and an alkene diol is caused to undergo cyclodehydration to give an oxatricyclodecene, according to the following equation:

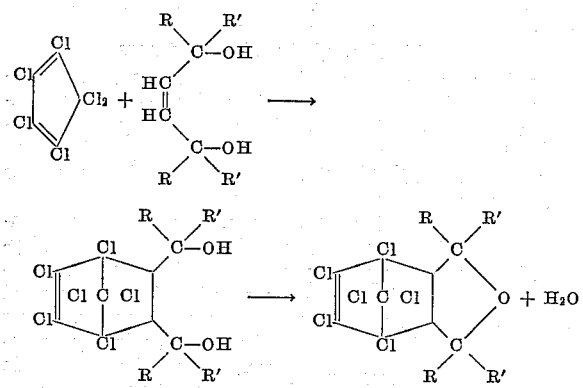

where R and R' taken separately are selected from the class consisting of hydrogen atoms and hydrocarbon radicals of from 1 to 18 carbon atoms, and R and R' taken together form, together with the carbon atom to which they are linked, six-membered carbocyclic ring system free of substituents other than hydrogen and chlorine atoms.

The above-mentioned method, while successful in giving the desired product, is time-consuming in practice, since the water liberated by the condensation reaction had to be removed by distillation as it was formed. It was also found that the product so obtained was of a lower degree of purity, necessitating the use of one or more recrystallization steps if it is desired to obtain a product of high purity.

I have now found that cyclodehydration of not only the Diels-Alder adduct, referred to above, but also the adducts containing other halogens such as fluorine and bromine, may be carried out by dissolving the diol adduct in concentrated sulfuric acid at a temperature above 70° C. and then pouring the solution directly into water. The oxatricyclodecene resulting from the cyclodehydration then separates out from the dilute acid solution in finely-divided crystalline form and with a high degree of purity. The present reaction is rapidly carried out usually in a matter of minutes rather than the many hours which were formerly necessary when the water was removed by the prior azeotropic distillation procedure.

The present process is best carried out by forming a complete solution of the Diels-Alder adduct in sulfuric acid. The acid should have a concentration of at least 65% $H_2SO_4$ and need not be stronger than 100% acid. Sufficient acid should be employed so as to completely dissolve the diol. Mere contacting of the diol with catalytic quantities of sulfuric or other mineral acids will not achieve the desired results. Upon completion of the dissolution of the diol in the acid, the solution should be heated to at least 70° C. and may be heated to as high a temperature as 130° C. It will be evident that equivalent satisfactory results will be obtained by first heating the acid to the desired elevated temperature and then dissolving the diol in the heated acid. Upon formation of the solution by either method described above, the solution is held at the elevated temperature for some 5–80 minutes, the time depending upon the temperature and strength of acid. The time necessary for the reaction should be adjusted to the particular temperature employed in such a manner that the shorter portion of the time range will correspond to the higher temperature and the stronger acid concentrations, while the longer portion of the time range will correspond to lower temperatures and weaker acid concentrations. The proper conditions for cyclodehydration may readily be ascertained by simple tests. Those skilled in the art will understand that failure to obtain the precipitate of desired product upon dilution of the sulfuric acid solution may be due to the fact that cyclization did not take place, since the first-formed acid sulfate of the diol is water-soluble. If no precipitate is formed upon dilution, or if the amount of precipitate is insufficient to account for all of the diol employed, it may be assumed that the time of heating was too short, or the acid concentration was too low to complete the dehydration of the diol. The remedy then is to increase the concentration of the acid, or to increase the time of heating. The above tests are conditioned upon first forming a complete solution of the diol in the acid. If, for some reason, the solution process is incomplete, the diol being insoluble in water and in dilute acid will be recovered unchanged from the diluted acid. As stated above, the mere contacting of the diol with the acid is not effective for the purpose of the present invention.

Hydrolysis of the desired product is prevented by careful dilution of the sulfuric acid solution. This is best done by flowing a small stream of the acid solution into the water with vigorous agitation so that localized overheating does not take place. The best practice to follow is that normally observed when adding concentrated sulfuric acid to water. The acid concentration, after dilution, should not be above about 5 or 10% $H_2SO_4$ and the temperature should not be above about 30–40° C.

It will, of course, be appreciated that both the concentrated acid solution prior to dilution and the water to which it is to be added, may be suitably cooled so that the desired final conditions are obtained. The amount of dilution water employed is not critical.

The product separating out upon dilution is removed by filtration, washed free of acid and dried. The yield is generally from 80–98% of the theory.

The alkenediols which may be used for the preparation of the above-mentioned Diels-Alder diols may be prepared by the reaction of an acetylenic compound with a carbonyl compound, i.e., an aldehyde or ketone, using conventional ethynylation procedures, followed by reduction of the acetylenic bond to an olefinic bond between the two contiguous carbon atoms adjacent to the two carbinol groups. Alkenediols which are employed in the present process are preferably those of the cis configuration. The alkenediols which may be employed in the present process include 2-butene-1,4-diol; symmetrical 1,4-lower-alkyl derivatives of 2-butene-1,4-diol such as 3-hexane-2,5-diol, 2,5-dimethyl-3-hexane-2,5-diol, 4-octene-3,6-diol, 2,6-dimethyl-4-octene-3,6-diol, 5-decene-4,7-diol, etc.; symmetrical 1,4-higher-alkyl derivatives of 2-butene-1,4-diol such as 1,4-di-3-heptyl-2-butene-1,4-diol, 1,4-dinonyl-2-butene-1,4-diol, 1,4-didodecyl-2-butene-1,4-diol, etc. Another class of ethylenic glycols useful in the present process are asymmetrical alkenediols such as 2-pentene-1,4-diol, 2-hexene-1,4-diol, 2-heptene-1,4-diol, 3-octene-2,5-diol, 2-tridecene-1,4-diol, 2-methyl-3-tetradecene-2,5-diol, etc. Also amenable to the present reaction are alkenediols of the above formula, wherein R and R' taken together form, with the carbon atom to which they are linked, a six-membered carbocyclic ring on which there are no substituents other than hydrogen or halogen atoms; examples of such cyclic diol compounds are 1,1'-vinylenedicyclohexanol, 2,2',3,3',4,4,4',4',5,5,5',6,6'-dodecachloro-1,1'-vinylenedi(2,5-cyclohexadiene-1-ol), etc.

The Diels-Alder adducts of the above diols with hexahalocyclopentadiene are compounds of the structure:

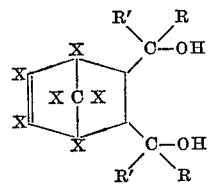

where R and R' are the groups set forth above and X is a halogen, such as fluorine, chlorine and bromine. Specific compounds of this type are: 2,3-bis(hydroxymethyl)-1,4,5,6,7,7 - hexaclorobicyclo[2.2.1]-5-heptene; 2,3-bis(α-hydroxyethyl) - 1,4,5,6,7,7 - hexachlorobicyclo[2.2.1] - 5-heptene; 2,3 - bis(1-hydroxycyclohexyl)-1,4,5,6,7,7-hexachlorobicyclo[2.2.1]-5-heptene; 2,3-bis(α-hydroxybenzyl)-1,4,5,6,7,7-hexachlorobicyclo[2.2.1]-5-heptene and 2,3-bis(α-hydroxyisopropyl) - 1,4,5,6,7,7 - hexachlorobicyclo-[2.2.1]-5-hexene, or the corresponding fluorine or bromine compounds. In some cases a single compound may contain both chlorine and fluorine, or all three halogens.

The oxatricyclodecenes which may be prepared by the cyclodehydration process of this invention are, generally, highly stable compounds which range from crystalline solids to oily liquids. They are active biological toxicants and are useful as components of agricultural pesticidal compositions. The simplest member of the present series, where R and R' of the above general formula represent hydrogen atoms, i.e., 1,7,8,9,10,10-hexachloro-4-oxatricyclo[5.2.1.0$^{2,6}$]-8-decene, is useful as a nematode toxicant.

The halogenated derivatives of this compound have powerful insecticidal properties. The present hexahalo-oxatricyclodecenes wherein short-chain alkyl groups are substituted on the carbon atoms contiguous with the oxygen atom of the ring skeleton may be usefully applied as agricultural insecticides. The oxatricyclodecenes of the above formula, wherein R is a long chain-alkyl radical, possess heightened oil solubility, and may be used as oil additives, e.g., for the inhibition of corrosion, and also as non-flammable plasticizers for polymers such as polyvinyl chloride. The spiro compounds susceptible of manufacture by the process of the invention as described hereinabove may be utilized as insecticides; the highly halogenated dispiro compounds of this series are also particularly stable to high temperatures and may be used as dielectrics. The new compounds of the invention are also useful as intermediates in organic synthesis, e.g., they may be converted to more highly chlorinated derivatives, etc.

The following examples illustrate various specific embodiments of this invention:

EXAMPLES 1 TO 17

A series of experiments were conducted with the bicyclic diol, 2,3-bis(hydroxymethyl)-1,4,5,6,7,7-hexachlorobicyclo[2.2.1]-5-hexene, utilizing varying proportions and concentrations of sulfuric acid at various temperature and for varying lengths of time. The bicyclic diol and sulfuric acid were heated in a test tube in an oil bath kept at the desired temperature. At the end of the reaction period the mixture was poured into water, filtered, washed free of acid and air dried. The data obtained are collected in the following table:

| Ex. | Acid [a] Conc. | Acid-Diol Ratio [b] | Temp., °C. | Time (Min.) | Yield, percent | Melting Point of Product, °C. |
|---|---|---|---|---|---|---|
| 3 | 95 | 880 | 120 | 60 | 90 | 238 |
| 4 | 95 | 440 | 120 | 60 | 78 | 243 |
| 5 | 95 | 220 | 120 | 60 | 92 | 237 |
| 6 | 95 | 110 | 120 | 60 | 98 | 244 |
| 7 | 95 | 55 | 120 | 60 | 96 | 244 |
| 8 | 80 | 690 | 120 | 60 | 92 | 236 |
| 9 | 70 | 565 | 120 | 60 | 94 | 238 |
| 10 | 60 | 450 | 120 | 60 | c 100 | 216 |
| 11 | 50 | 350 | 120 | 60 | c 100 | 204 |
| 12 | 95 | 110 | 120 | 10 | 86 | 235 |
| 13 | 95 | 110 | 120 | 20 | 94 | 244 |
| 14 | 95 | 110 | 120 | 30 | 82 | 246 |
| 15 | 95 | 880 | 100 | 60 | 98 | 245 |
| 16 | 95 | 880 | 80 | 60 | 94 | 245 |
| 17 | 95 | 880 | 60 | 60 | d 0 | |

[a] Percent $H_2SO_4$.
[b] Expressed in parts by weight of 100% sulfuric acid per 100 parts of bicyclic glycol.
[c] The bicyclic diol did not dissolve in the sulfuric acid during the heating period. Essentially no cyclization occurred and the bicyclic diol was recovered.
[d] No cyclization occurred since no product precipitated on treating the reaction mixture with water. Apparently, only the water soluble acid sulfate of the bicyclic diol was formed.

Purification of Oxatricyclodecenes

In the preceding description and examples I have illustrated the application of my invention to the cyclodehydration of the Diels-Alder diols formed by the adduction of alkene diols with hexahalorocyclopentadiene and I have disclosed that the resulting oxatricyclodecenes are of considerably higher purity than are the products prepared by the prior art methods. As a further extension of my invention, I have discovered that oxatricyclodecenes of low purity prepared by the prior art methods may also be purified by solution in concentrated sulfuric acid followed by dilution with water. This method is carried out much the same as is my cyclodehydration process. However, I have found that in the temperature limits to which the solution of the oxatricyclodecene in sulfuric acid is subjected, may be broadened to encompass the range of from about 10° C. to about 130° C. The limits of concentration of the sulfuric acid are the same as indicated above, namely, from about 65% to 100% $H_2SO_4$. The time during which the solution is maintained prior to dilution is not highly critical, being somewhat dependent upon the amount and character of the impurities present. If the impurity consists in part of the Diels-Alder diol, the time should be sufficient to permit cyclodehydration to take place.

The step of dilution and the precautions to be observed therein are the same as described above in connection with my cyclodehydration process. That is, it is best done by flowing a stream of the acid solution into water with vigorous agitation so that localized overheating does not occur. The acid concentration after dilution should not be above about 5% or 10% $H_2SO_4$ and the temperature should not exceed about 30°–40° C.

After dilution, the precipitated product is recovered by filtration, washed free of acid and dried. The yield is substantially quantitative.

The following examples illustrate specific embodiments of this feature of the present invention:

EXAMPLE 18

A mixture of 17.6 g. (0.2 mole) of cis-2-butene-1,4-diol and 54.6 g. (0.2 mole) of hexachlorocyclopentadiene in 50 g. of o-dichlorobenzene was heated for 7 hours at a temperature of about 110° C. Water was evolved during the reaction and was removed through an air condenser at room temperature. Upon cooling the reaction mixture, it was observed that 22 grams of crystals separated from the reaction mixture. This adduct product was impure 1,7,8,9,10,10 - hexachloro - 4 - oxatricyclo [5.2.1.0$^{2,6}$]-8-decene having a melting point of 197°–203° C. In order to purify the said intermediate product, 103 g. of concentrated sulfuric acid (1.86 sp. gr.)

was added to the 22 grams of crude product, corresponding to 830% by weight, calculated as 100% strength acid relative to the weight of the adduct. The solution thus obtained was poured into water. It was found that a purified form of the said 1,7,8,9,10,10-hexachloro-4-oxatricyclo[5.2.1.0$^{2,6}$]-8-decene having a melting point of 241° C. was obtained.

EXAMPLE 19

The method of Example 18 employed with 1.4-dinonyl-cis-2-butene-1,4-diol was conducted by reacting the diol with hexachlorocyclopentadiene to give a crude form of 1,7,8,9,10,10 - hexachloro - 3,5-dinonyl - 4 - oxatricyclo-[5.2.1.0$^{2,6}$] - 8 - decene, molecular weight 595.34 ($C_{27}H_{42}Cl_6O$).

Fifteen percent by weight of 70% strength sulfuric acid was added to the reaction mixture which was then stirred at a temperature of 130° C. for 10 minutes in order to dissolve the adduct. The entire mixture was poured into water in order to obtain a purified form of 1,7,8,9,10,10-hexachloro-3,5 - dinonyl - 4-oxatricyclo-[5.2.1.0$^{2,6}$] - 8 - decene, molecular weight 595.34 ($C_{27}H_{42}Cl_6O$).

What is claimed is:

1. A process for the treatment of compounds selected from the group consisting of bicyclic diols having the formula:

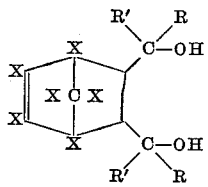

and oxatricyclodecene cyclization products thereof having the formula:

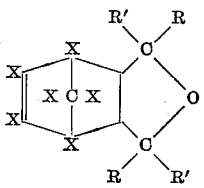

where X is a halogen selected from the group consisting of fluorine, chlorine and bromine, R and R' taken separately are selected from the class consisting of hydrogen and hydrocarbon radicals of from 1 to 18 carbon atoms, and R and R' taken together form, together with the carbon atom to which they are linked, a six-membered carbocyclic ring system free of substituents other than hydrogen and halogen atoms, which comprises dissolving the said compound in sulfuric acid, having a concentration within the range of from 65% to 100% $H_2SO_4$, and thereafter separating the said oxatricyclodecene product by precipitating the same by diluting the said solution with water.

2. The process of claim 1 in which the said solution is formed in sulfuric acid having a concentration of from 65% to 100% $H_2SO_4$ by weight, and the dilution with water is carried to a concentration of less than 10% $H_2SO_4$.

3. The process which comprises heating to a temperature above 70 C. a solution in sulfuric acid of a bicyclic diol having the structure:

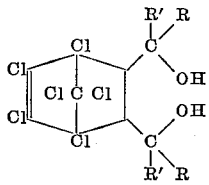

in which R and R' taken separately are selected from the class consisting of hydrogen atoms and hydrocarbon radicals of from 1 to 18 carbon atoms, and R and R' taken together form, together with the carbon atom to which they are linked, a six-membered carbocyclic ring system free of substituents other than hydrogen and chlorine atoms, said sulfuric acid having a concentration of from 65% to 100% $H_2SO_4$ and thereby cyclizing the same to form a compound of the structure:

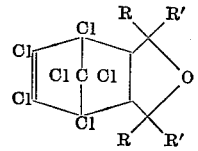

and thereafter separating the said compound in pure form by precipitating the same by diluting the said mixture with water.

4. The process which comprises heating a solution of 2,3 - bis(hydroxymethyl) - 1,4,5,6,7,7 - hexachlorobicyclo[2.2.1]-5-heptene in sulfuric acid of at least 65% $H_2SO_4$ and thereby cyclizing the same, and thereafter separating a purified from of the said cyclized product by diluting the solution with water.

5. The process of claim 4 in which the sulfuric acid solution is heated to a temperature in the range of from 70° C. to 130° C.

6. Process for the purification of compounds having the formula:

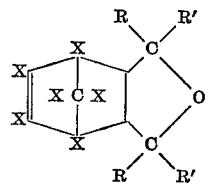

from impurities resulting from the production thereof by a Diels-Alder reaction where X is selected from the group consisting of fluorine, chlorine and bromine, R and R' taken separately are selected from the class consisting of hydrogen and hydrocarbon radicals of from 1 to 18 carbon atoms, and R and R' taken together form, together with the carbon atom to which they are linked, a six-membered carbocyclic ring system free of substituents other than hydrogen and halogen atoms, which comprises dissolving the said compound in sulfuric acid, having a concentration within the range of 65% to 100% $H_2SO_4$, and thereafter separating the said oxatricyclodecene product by precipitating the same by diluting the said solution with water.

7. The process of claim 6 in which the said solution in sulfuric acid is formed with sulfuric acid having a concentration of from 65% to 100% by weight, and the temperature of the solution is maintained in the range of from 10° C. to 130 C.

8. The process for the purification of 1,7,8,9,10,10-hexachloro-4-oxatricyclo[5.2.1.0$^{2,6}$]-8-decene which comprises dissolving the same in sulfuric acid having a concentration of from 65% to 100% $H_2SO_4$, and thereafter precipitating the purified compound by diluting the said solution with water.

References Cited in the file of this patent

FOREIGN PATENTS

| Re. 15,324 | Germany | Apr. 12, 1956 |
| 772,212 | Great Britain | Apr. 10, 1957 |
| 83,106 | Netherlands | Oct. 15, 1956 |
| 83,954 | Netherlands | Jan. 15, 1957 |

OTHER REFERENCES

MacArdle: Use of Solvents (D. Van Nostrand Co., 1925), p. 25.

Jones: Inorganic Chemistry (Blakiston Co., 1947), pp. 211–212.